US009303803B2

(12) United States Patent
Gifford (10) Patent No.: US 9,303,803 B2
(45) Date of Patent: Apr. 5, 2016

(54) RESTRAINING JOINT DEVICE

(71) Applicant: Mueller International, LLC, Atlanta, GA (US)

(72) Inventor: Paul Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 151 days.

(21) Appl. No.: 14/084,013

(22) Filed: Nov. 19, 2013

(65) Prior Publication Data

US 2015/0137514 A1    May 21, 2015

(51) Int. Cl.
| | |
|---|---|
| *F16L 21/06* | (2006.01) |
| *F16L 37/092* | (2006.01) |
| *F16L 21/08* | (2006.01) |

(52) U.S. Cl.
CPC ............ *F16L 37/0925* (2013.01); *F16L 21/08* (2013.01)

(58) Field of Classification Search
CPC ........ F16L 21/007; F16L 21/04; F16L 21/045
USPC .................................. 285/232, 338, 339, 342
See application file for complete search history.

(56) References Cited

U.S. PATENT DOCUMENTS

| | | | | |
|---|---|---|---|---|
| 748,807 | A | | 1/1904 | Spratt |
| 2,197,450 | A | * | 4/1940 | Curtis ........................... 285/369 |
| 2,258,135 | A | * | 10/1941 | Curtis ........................... 285/350 |
| 2,647,769 | A | * | 8/1953 | Smith ........................... 285/349 |
| 2,721,581 | A | * | 10/1955 | Risley et al. .................. 285/373 |
| 3,148,902 | A | * | 9/1964 | Gardner, Sr. et al. ......... 285/339 |
| 3,257,118 | A | * | 6/1966 | Broadhead et al. ........... 277/621 |
| 4,575,129 | A | * | 3/1986 | Porowski ....................... 285/345 |
| 4,699,405 | A | * | 10/1987 | Miller ........................... 285/341 |
| 4,753,461 | A | * | 6/1988 | Miller ........................... 285/338 |
| 5,476,290 | A | | 12/1995 | Bergmann et al. |
| 7,004,511 | B2 | | 2/2006 | Barron et al. |
| 7,104,573 | B2 | | 9/2006 | Copeland |
| 7,125,054 | B2 | | 10/2006 | Jones |
| 7,484,775 | B2 | | 2/2009 | Kennedy, Jr. |
| 7,537,248 | B2 | | 5/2009 | Jones et al. |
| 7,774,915 | B2 | | 8/2010 | Darce et al. |
| 7,815,225 | B2 | | 10/2010 | Jones et al. |
| 7,837,238 | B2 | * | 11/2010 | Krausz et al. ................. 285/343 |

(Continued)

FOREIGN PATENT DOCUMENTS

| | | | |
|---|---|---|---|
| DE | 852480 | * | 7/1949 |
| GB | 573194 | * | 11/1943 |

OTHER PUBLICATIONS

Gifford, Paul; PCT Application entitled: Restraining Joint Device, having serial No. PCT/US14/63658, filed Nov. 3, 2014, 29 pgs.

(Continued)

*Primary Examiner* — David E Bochna
(74) *Attorney, Agent, or Firm* — Taylor English Duma, LLP (57) ABSTRACT

A pipe joint is disclosed that includes an outer sleeve or housing wherein the housing defines a longitudinal axis and includes a first end located along the longitudinal axis that defines a first aperture that is at least partially decreasing in size along the longitudinal axis, the first aperture being further defined by a surface found inside of the housing, and a second end along the longitudinal axis that defines a second aperture. The joint further comprises a seal, a gripping member, and a draw member that is operatively associated with the housing and seal.

19 Claims, 10 Drawing Sheets

(56) References Cited

U.S. PATENT DOCUMENTS

| | | | |
|---|---|---|---|
| 8,186,723 B2* | 5/2012 | Kim | 285/342 |
| 8,894,100 B2 | 11/2014 | Eaton et al. | |
| 2003/0085566 A1 | 5/2003 | Rex et al. | |
| 2013/0082463 A1 | 4/2013 | Benson | |
| 2015/0240975 A1 | 8/2015 | Eaton et al. | |

OTHER PUBLICATIONS

Mueller Co.; "Mueller Insta-Tite Connection" product brochure, Copyright 2004 Mueller Co., 4 pgs.

Gifford, Paul; International Search Report and Written Opinion for serial No. PCT/US14/63658, filed Nov. 3, 2014, mailed Feb. 11, 2015, 8 pgs.

* cited by examiner

RESTRAINING JOINT DEVICE

FIELD

This disclosure relates to pipe element connections. More specifically, this disclosure relates to pipe joints, pipe couplings, and pipe sockets.

BACKGROUND

Pipe elements such as pipes, valves, and meters typically are not made of one piece. Rather, such pipe elements are typically formed in finite lengths and must be joined. One way of joining such pipe elements is through the use of a coupling member. A sealing gasket is typically disposed in a coupling void that comprises at least one coupling segment which is thereafter tightened around the pipe elements to be joined. Similarly, pipe sockets may be used to join pipes, including pipes having different diameters, or to join a valve or meter to a pipe where the end of the valve or meter may have approximately the same outer diameter as a pipe. When the pipe socket has pipe threads on one end and gripping members on the other end, the pipe socket may have one end with a larger diameter having internal pipe threads for receiving the external threads of a pipe, valve, or meter and another end with a smaller diameter for frictionally receiving and retaining a pipe element. In some cases, the pipe socket may be integral with a valve, meter, pipe, hydrant or other pipe element.

SUMMARY

Disclosed is a joint comprising a housing wherein the housing defines a longitudinal axis and includes a first end located along the longitudinal axis that defines a first aperture that is at least partially decreasing in size along the longitudinal axis, said aperture further defined by a surface located inside the housing, and a second end located along the longitudinal axis that defines a second aperture. The joint also includes a seal that is in contact with the inside surface of the first aperture, a gripping member that is in contact with the inside surface of the first aperture, and a draw member that is operatively associated with the seal and the gripping member.

Also disclosed is a method for joining or coupling two pipe elements together wherein the joint comprises a housing wherein the housing defines a longitudinal axis and includes a first end located along the longitudinal axis that defines a first aperture that is at least partially decreasing in size along the longitudinal axis, said aperture further defined by a surface located inside the housing, and a second end located along the longitudinal axis that defines a second aperture. The joint also includes a seal that is in contact with the inside the first aperture, a gripping member that is inside the first aperture and a draw member that is operatively associated with the seal and the gripping member. The method comprises: placing the joint onto the first pipe element and drawing the draw member and moving the seal until the seal engages the inner surface of the first aperture of the housing and contacts the first pipe element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Disclosed are devices for creating joints between pipe elements and associated methods, systems, devices, and various apparatus. The joint includes at least one housing, at least one draw member, and at least one seal. Housings are adapted to seal pipe elements in a variety of configurations including end-to-end relationship where the pipe elements are nearly touching or are spaced away, as well as situations where the pipe elements are angled with respect to each other such as being perpendicular to each other as is the case with right angle fittings or couplings. When joining two pipe elements, the apparatus actually provides two sockets or housings, each housing forming a joint, one for each pipe element, and in such a case, the apparatus would be called by one skilled in the art a coupling. Also, the coupling may be used in situations where a plain-end pipe is inserted in one end and a threaded pipe is attached to the other end. Accordingly, the term "joint" as used herein should be interpreted broadly and should be applied to any application where two pipe elements may be applied and should also include situations where the joint is formed by a housing that is connected to or permanently attached to or integral with devices such as valves, meters, or hydrants for example. While it is particularly useful in applications for plain-end pipes, it should not be so limited as it could be used with pipes having grooves or shoulders as well, for example. It would be understood by one of skill in the art that the disclosed socket is described in but a few exemplary embodiments among many. No particular terminology or description should be considered on the disclosure or the scope of any claims issuing therefrom.

Figure 1:
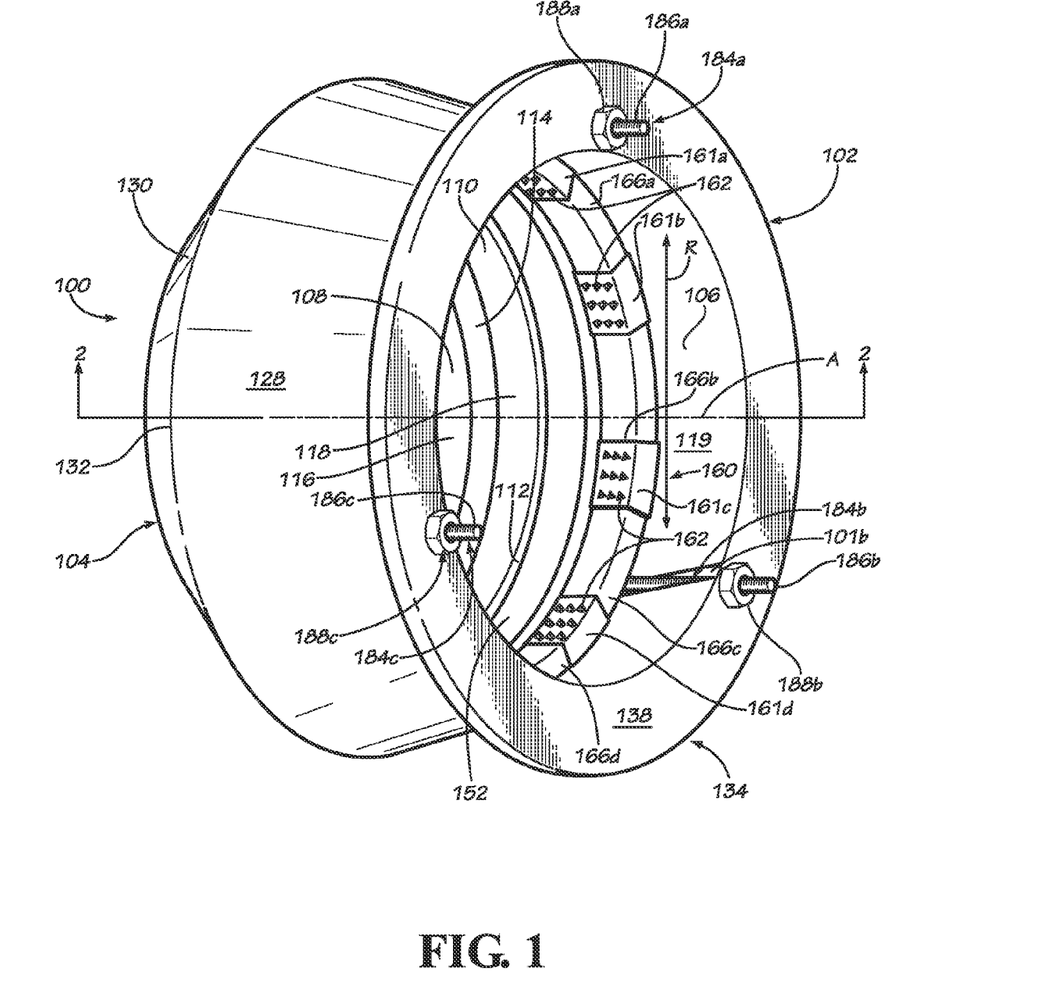
FIG. 1 is a perspective view of a housing, seal, gripping members, and draw members and associated assemblies for providing a joint according to a first embodiment of the present disclosure.
Figure 2:
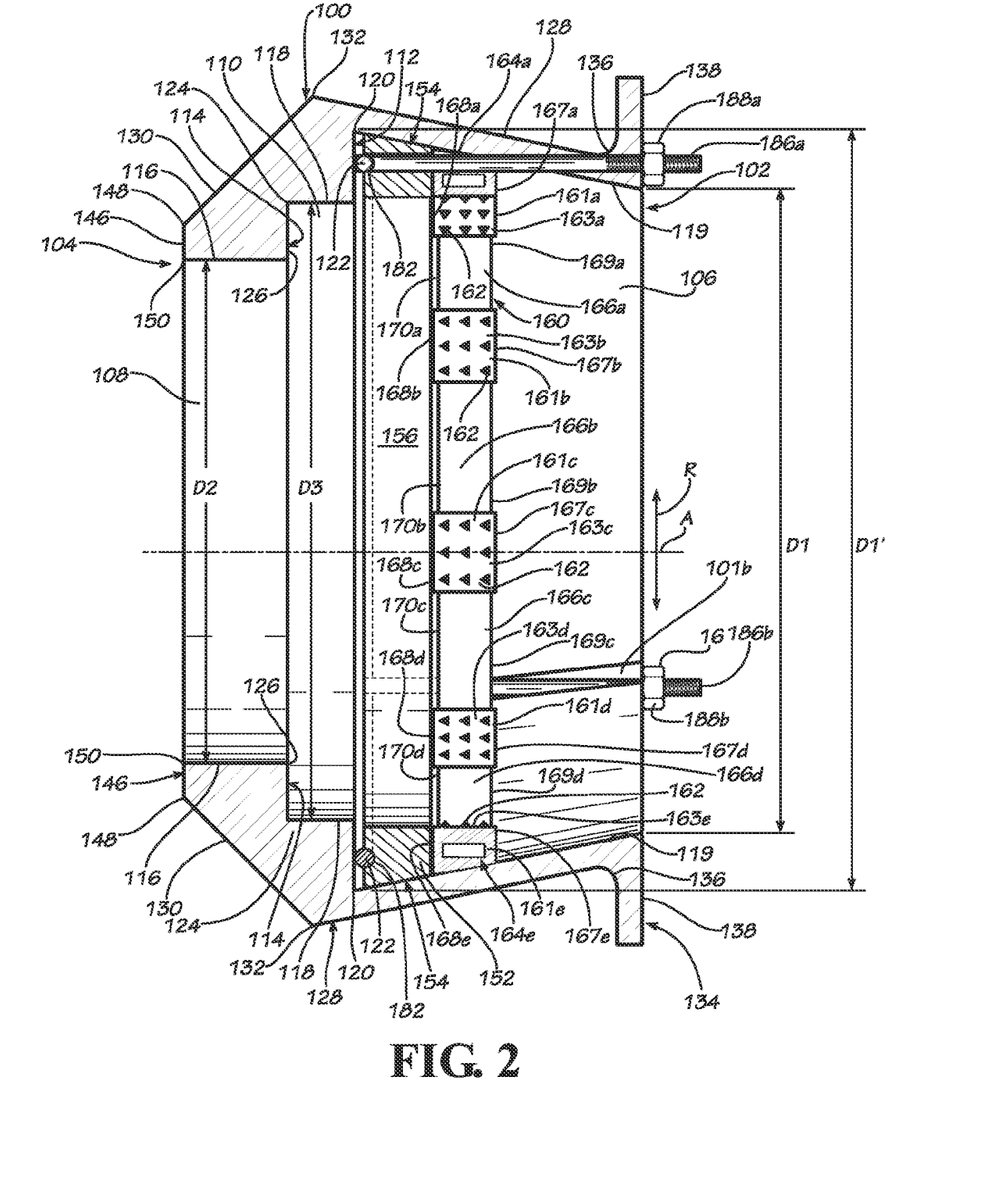
FIG. 2 is cross-sectional view of the joint of FIG. 1 taken along line 2-2 thereof.

One embodiment of a joint is disclosed and described in FIGS. 1 and 2. The joint includes a housing 100, sleeve or body that defines a longitudinal axis A and a first end 102 and a second end 104 that are found or located along the axis. The configuration of the housing 100 is substantially annular with a radial direction R and also has a varying profile when looking at a cross-section taken along a plane that is coincident with the longitudinal axis A as seen in FIG. 2. The first end 102 defines a first aperture 106 and the second end 104 defines a second aperture 108. The first aperture 106 decreases in size or is tapered linearly in a direction along the longitudinal axis A going from the interior of the housing toward its exterior. Situated between the first aperture 106 and second aperture 108 is a third aperture 110 that is in communication with both the first and second apertures 106, 108 and that is defined by the housing 100. The larger end of the first aperture 106 is greater in size than the third aperture 110, creating a shoulder as a first stop surface 112 that is also useful in a manner that will be described later herein. Similarly, the third aperture 110 is larger than the second aperture 108, providing another shoulder that defines the third aperture 110 and functions as a second stop surface 114 that is advantageous in a manner that will be described later herein for preventing the pipe element from reaching the second aperture 108.

Specifically focusing on FIG. 2, since the housing 100 is annular in shape, each of the second aperture 108 and third aperture 110 are round in nature and have an inner diameter D2 and D3, respectively, in the radial direction R that is defined by an associated cylindrical surface 116, 118 respectively. Naturally, the first stop surface 112 at the end of the first aperture 106 has an outer edge 120 that is defined by the intersection of the conical wall 119 of the first aperture 106 and the first stop surface 112. The first stop surface 112 also has an inner edge 122 that is defined by the intersection of the first stop surface 112 and the cylindrical wall 118 of the third aperture 110. Similarly, the second stop surface 114 at the end of the third aperture 110 has an outer edge 124 that is defined by the intersection of the cylindrical surface 118 of the third aperture 110 and the second stop surface 114. The second stop surface 114 also has an inner edge 126 that is defined by the intersection of the second stop surface 114 and the cylindrical wall 116 of the second aperture 108. The first aperture has a small diameter D1 near the outside of the housing 100 and large diameter D1' near the inside of the housing created by the conical shape of the aperture.

These diameters D1, D1', D2, and D3 and associated cylindrical and conical surfaces 116, 118, 119 can be most clearly seen in FIG. 2. The tapering or reduction in diameter (D1' to D1) of the first aperture 106 occurs along the entire length of the aperture along the longitudinal axis A of the housing but it is contemplated that only a portion of the aperture may be decreasing in size. As can be seen, the diameter D1 at the first end 102 of the joint is smaller than its diameter D1' adjacent the third aperture 110 along the longitudinal axis A of the housing 100. Both diameters D1, D1' of the first aperture 106 are larger than the diameters D2, D3 of the second and third apertures 108, 110 with the smaller diameter D1 of the first aperture 106 being slightly greater than the diameter D3 of the third aperture 110. The diameter D3 of the third aperture 110 is larger than the diameter D2 of the second aperture 108. The relative orientation and sizes of the first aperture 106, second aperture 108, and the third aperture 110 are advantageous for use with pipe elements in a manner that will be elaborated upon further later herein. For example, in some embodiments, the diameter D3 of the third aperture 110 is slightly greater than the outer diameter of the pipe element which the third aperture 110 is configured to receive and the diameter D2 of the second aperture 104 is about the same size as the inside diameter of the pipe element.

The second aperture 108 and the third apertures 108 are shown to have cylindrical surfaces but it is contemplated that these surfaces could be slightly conical as would be the case if draft were provided to aid in demolding when a molding or casting process is used to make the housing 100 so these embodiments are contemplated as well to be within the purview of the present disclosure. Similarly, the first aperture 106 creates an undercut in the direction of draw (along axis A) for making the aperture, making it difficult to manufacture using a molding or casting process. However, it is possible to make the first aperture 106 by using a collapsible core or lost core molding or casting technologies. At the very least, the undercut could be machined after the majority of the first aperture was made using a molding or casting process.

Returning to FIG. 1, there is a first sloping surface 128 on the exterior of the housing 100 that extends from the first end 102 of the housing 100 toward the interior of the housing 100 along the longitudinal axis A and a second sloping surface 130 that extends from the second end 104 of the housing 100 toward the interior of the housing along the longitudinal axis A and terminates at an intersection 132 with the first sloping surface 128. The first sloping surface 128 is found adjacent the first aperture 106 and a portion of the third aperture 110 (best seen in FIG. 2) while the second sloping surface 130 is found adjacent the second aperture 108 and a portion of the third aperture 110, all in a direction that is parallel to the longitudinal axis A of the housing. The function of the sloping surfaces is to generally follow the interior contours of the apertures to help maintain a nominal or typical wall thickness and to provide draft, desirable when making the housing using a casting or molding process to avoid manufacturing defects and to aid in demolding. Surrounding the periphery of the first aperture 106 found at the first end 102 of the housing 100 is a flange 134 that extends away from the housing 100 and that has an annular configuration.

As best seen in FIG. 2, the first sloping surface 128 terminates and transitions into this flange 134 via a blend 136. This flange 134 provides a first exterior annular surface 138 that surrounds the first aperture 106 and provides a load bearing surface that will be used to move components of the joint as will be described in further detail later herein. This annular surface is defined by an inner edge 140 that is defined by the intersection of the inner surface 119 of the first aperture 106 and the bearing surface 138. This annular surface is further defined by an outer edge 142 that is defined by the intersection of the peripheral surface 144 of the flange 134 and the bearing surface 138. A second exterior annular surface 146 is positioned adjacent the opening of the second aperture 108, defining the furthermost extent of the housing 100 along the longitudinal axis A in the other direction. The second sloping surface 130 terminates into this second annular surface 146, defining an outer edge 148 of the second exterior annular surface 146. An inner edge 150 of the second exterior annular surface 146 is defined by the intersection of the cylindrical surface 116 of the second aperture 108 and the second exterior annular surface 146 itself.

The flange 134 may be made integral with the housing 100 or may be added after the majority of the housing 100 has been made using a casting or molding process. In such a case, the flange 134 may be welded onto the housing 100 or attached by other methods or devices known in the art such as by the use of fasteners. In any case, the flange 134 should be added in a manner that keeps any seam or joint away from the apertures through which fluid will flow or those seams or joints should be fluid tight so that the function of the housing to provide a fluid tight joint is not compromised.

While this embodiment of the housing 100 is shown to have a straight longitudinal axis A, it is contemplated that the axis could curve or be angled such as is the case with a right angle fitting, coupling or socket. Accordingly, the present disclosure further contemplates these embodiments as well. Furthermore, the outer configuration of the housing 100 need not be annular in nature but could have other shapes as well. Likewise, the tapering of the inside surface of the first aperture need not be done in a linear fashion as long as it reduces in size along the longitudinal axis A in either direction along some portion of the first aperture 106. For example, the inside surface may be reduced going from the outside of the housing toward the inside of the housing along the longitudinal axis instead of the other way around. Also, the relative sizing of the first aperture 106, the second aperture 108, and the third aperture 110 may change so that one aperture is not necessarily smaller or larger than another and it is even contemplated that the third aperture 110 may be omitted. For example, the first aperture 106 may transition directly into the second aperture 108. Also, the housing is shown in isolation from a valve or hydrant but it may in many embodiments be integral with a valve, meter, hydrant or other pipe element.

Figure 3:
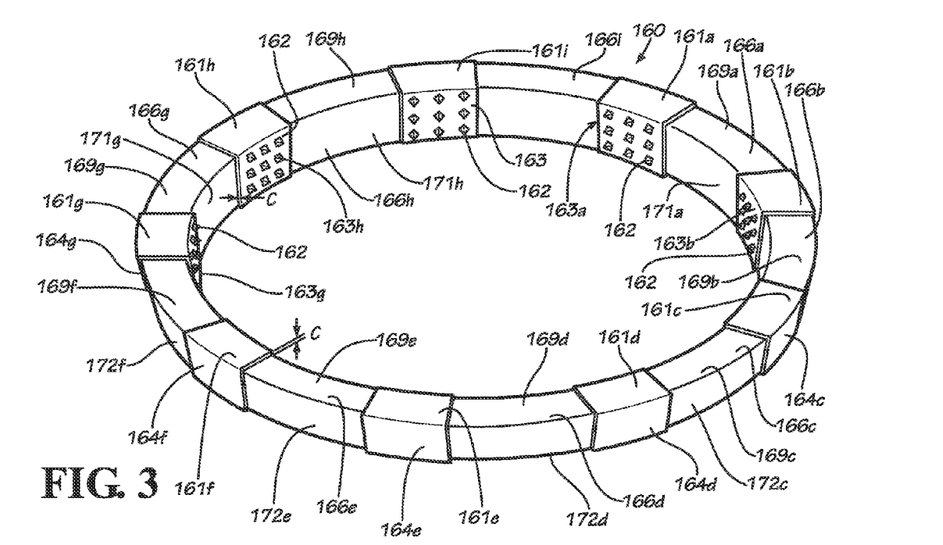
FIG. 3 is a perspective view of a gripping assembly of the joint of FIG. 1.
Figure 4:
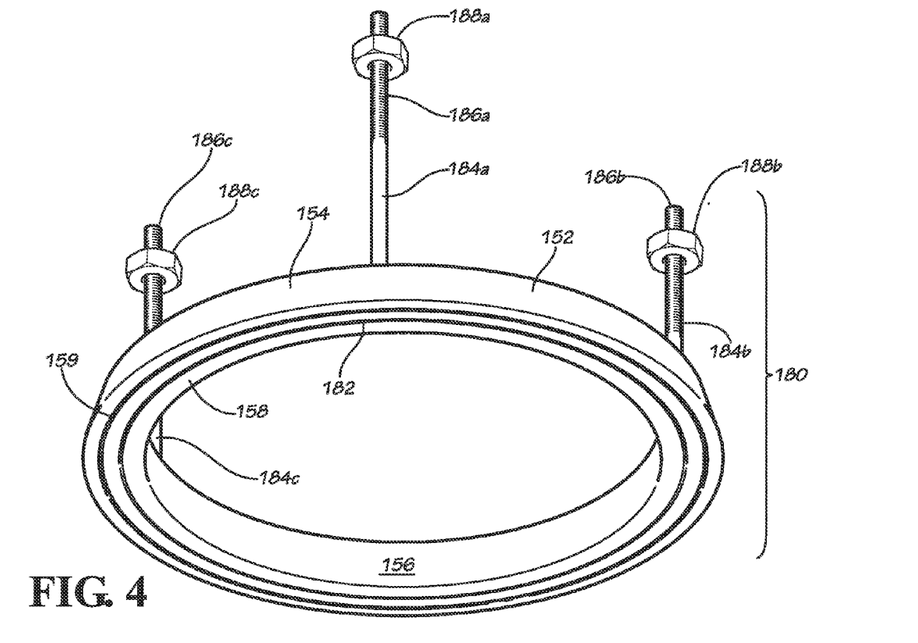
FIG. 4 is a perspective view of the seal and draw-bar assembly of the joint of FIG. 1 assembled by themselves.
Figure 5:
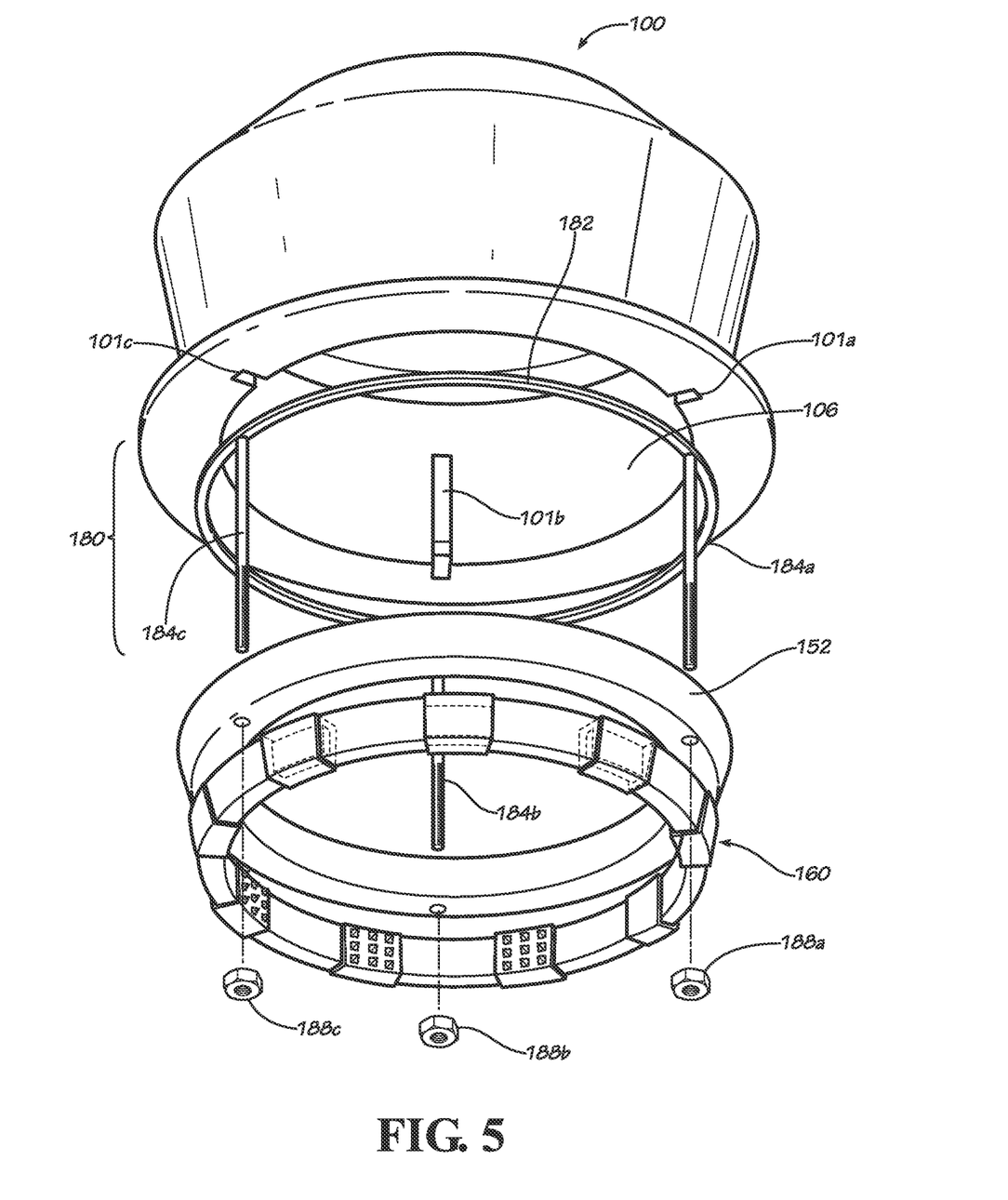
FIG. 5 is an exploded assembly view of the joint of FIG. 1.

Again referring to FIGS. 1 and 2, the joint further comprises a seal 152, a gripping assembly 160 and a draw-bar assembly 180 (best shown in FIGS. 4 and 5). Looking at the cross-section shown in FIG. 2, it can be seen that the draw-bar assembly 180 comprises a platform 182 made of a ring that supports the seal 152 and three draw-bars 184a, 184b, 184c that are connected to the platform 182 and that extend through holes 101a, 101b, and 101c (best seen in FIG. 5) or slots in the housing 100 past the first exterior annular surface 138 of the flange 134 adjacent the first aperture 106 of the housing 100 in a direction parallel to the longitudinal axis A. In the unassembled or untightened state, the platform 132 and seal 152 rest on or near the first stop surface 112 found at the innermost extent of the first aperture 106. At the same time, the seal 152 and gripping assembly 160 or portions thereof are in slight contact with the inside surface 119 of the first aperture 106. Only one draw-bar 184 or draw member may be necessary in some embodiments. Similarly, nine gripping members 161 are used in this embodiment (as best seen in FIGS. 3 and 5) but it is contemplated that more or less could be provided in other embodiments.

Figure 7A:
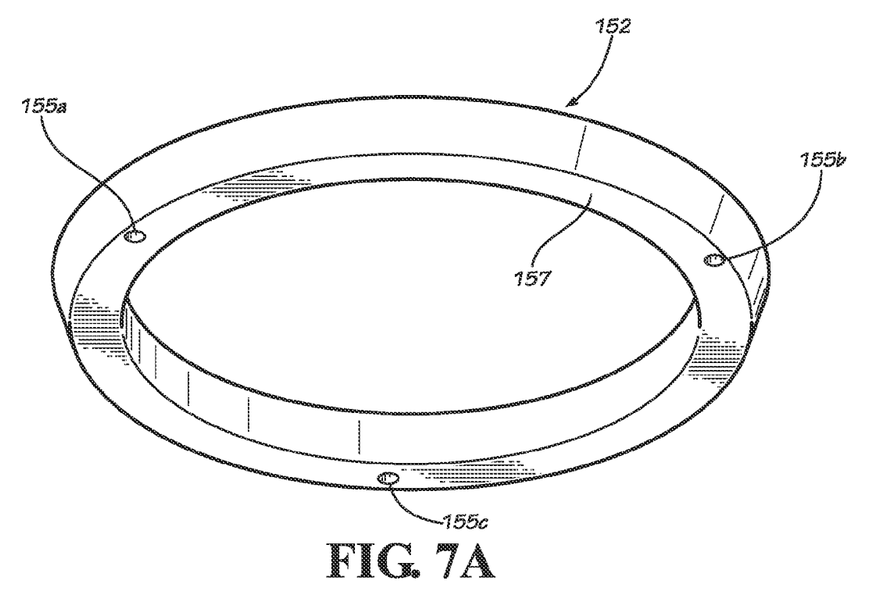
FIGS. 7A and 7B are alternate front and back perspective views of a seal of the joint of FIG. 1 shown by itself.

Looking closely at the shape and position of the seal 152 and the gripping assembly 160 as shown in FIGS. 2, 3, and 4, it can be seen that the seal 152 has a generally annular shape that extends a full circle or 360 degrees rotation about the longitudinal axis A. The seal 152 also has an outside peripheral surface 154 that is angled in a complimentary fashion to the inside surface 119 of the first aperture 106, allowing it to provide an angled sealing plane that is in contact with the housing 100 of the joint. The seal 152 further includes an inner sealing surface 156 for contacting a pipe element that is placed within the housing 100. In this embodiment, the sealing surface 156 is cylindrical but it could be curved any other desired shape. Looking at FIGS. 7A and 7B, the front surface 157 and the back surface 158 of the seal 152 are annular in shape and the back surface 158 has a groove 159 for receiving the ring or platform 182 of the draw-bar assembly 180 as will be discussed below. Also, holes 155a, 155b, and 155c are provided for the draw-bars 184 to extend through from the ring or platform 182. The "seal" may be made of rubber, plastic, cork, wood, metal, ceramic, polymer, elastomer, rosin, foam, any combination of the foregoing materials, or any material suitable for sealing two pipe elements joined in end-to-end relationship. It is contemplated that the seal could be any commercially available O-ring or gasket or could be customized as desired. Another possible modification is that the groove for receiving the platform could extend radially outward from the platform far enough to allow the seal to slide against the platform as the seal is pushed inwards during the camming motion. In fact, the groove 159 could extend all the way to the camming or slanted surface 154 of the seal 152.

Looking at the gripping assembly 160 as shown in FIGS. 1, 2, and 3, it can be seen that this assembly 160 includes a series of gripping members 161 that are interconnected by bodies 166 made of resilient material. Each gripping member 161a thru 161i has a series of ridges or protuberances 162 that are found on their inside cylindrical surfaces 163a thru 163i for contacting the pipe element in a manner that will be described herein shortly. Alternatively, the gripping member 161 may have a rough surface finish or may be configured to engage depressions found on the outside of the pipe element for providing the necessary grip to keep the housing 100 on the pipe element. Each gripping member 161 also has an angled or slanted outer periphery surface 164a thru 164h that is complimentarily-shaped to the inside surface 119 of the first aperture 106 of the housing 100. The connecting bodies 166 of the gripper assembly 160 are slightly undersized compared to the gripping members 161 themselves, providing for clearance C between the housing 100 and the connecting bodies 166 allowing them to flex which is advantageous as will now be described herein. Overall, the gripper assembly 160 forms an annular ring.

Figure 6A:
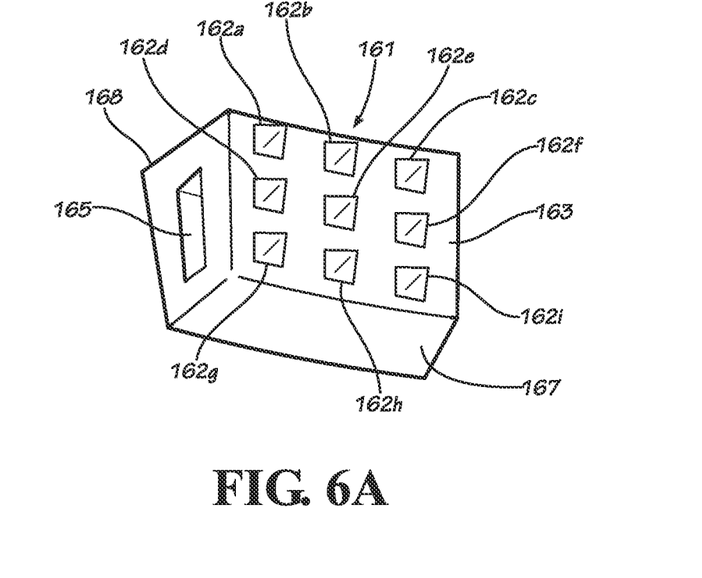
FIGS. 6A and 6B are alternate front and back perspective views of a gripping member of the gripping assembly of the joint of FIG. 1 shown by itself.
Figure 6B:
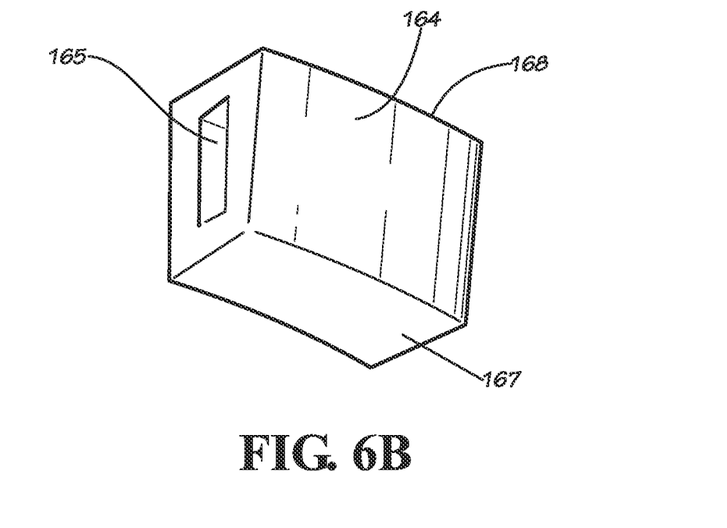

As illustrated by FIGS. 6A and 6B in detail, the gripper members 161 have surfaces 163 and 164 and protuberances 162 as just described and may be made from bronze, wearite, steel or another material that can effectively hold onto the pipe while also be able to slide with an acceptable amount of friction. The interconnecting bodies 166 may be made from rubber, plastic or other resilient material that allows the flexing of the interconnecting bodies 166 and inward motion of the gripper members 161.

Also, the interconnecting bodies 166 may be made from materials similar to the seal 152 and may be joined to the gripping member 161 by methods known in the art including molding an elastomer through a central hole 165 found in each of the gripping members 161 so that the interconnecting bodies 166 form a complete ring about the longitudinal axis A with the gripping members 161 spaced equidistantly about the periphery of the housing 100 (best seen in FIGS. 2 and 3). However, it is contemplated that this joining of the gripping members may be accomplished using other methods known in the art. As mentioned previously, the gripper assembly 160 may comprise the gripping members 161 and interconnecting bodies 166 forming an annular configured assembly where each of the front and rear surfaces 167, 168 of gripping members 161 is adjacent the front and rear surfaces 169, 170 of the interconnecting bodies 166. Also, each of the inner circumferential surfaces 171 of the interconnecting bodies 166 may be found adjacent the gripping surfaces 163 of the gripping members 161 and each of outer slanted surfaces 172 of the interconnecting bodies 166 may be found adjacent the slanted cam surface 164 of the gripping members 161. However, the surfaces of the interconnecting bodies may be offset or spaced away (clearance C shown in FIGS. 2 and 3) from the adjacent surfaces of the gripping members to provide the necessary clearance to allow the flexing of the interconnecting bodies so that the gripping members can move as needed for clamping onto a pipe element.

Focusing on FIGS. 1 and 2, the inside conical surface 119 of the first aperture 106 has two primary purposes. The first is to act as a cam surface that causes the seal 152 and the gripping assembly 160 to contract their inner diameter as they are drawn via the draw bars 184a, 184b, 184c toward the exterior of the housing 100 along the longitudinal axis A. Specifically, as the draw-bars 184a, 184b, 184c are pulled outward along a direction that is parallel to the longitudinal axis A of the housing 100, the platform 182 moves in the same direction as it is connected to the draw-bars 184a, 184b, 184c. The platform 182 in turn pushes on the seal 152 that presses on the gripper assembly 160. At the same time, the angled surface 119 of first aperture 106 pushes on the angled surfaces 154, 164 of the seal 152 and gripping members 161, causing them to move inward along the radial direction R of the housing 100. The interconnecting bodies 166 of the gripper assembly 160 flex during this process a slight amount, which is possible due to the clearance provided between the housing of the joint and the connecting bodies as previously described. The second purpose of the inside surface 119 is to act as a fluid sealing surface. Since the seal 152 contacts the inside surface 119 of the first aperture 106, it prevents fluid from entering any space found between the housing of the joint and the seal as such space is effectively eliminated.

During the camming motion of the seal 152 and gripper assembly 160, the protuberances 162 or ridges of the gripper members 161 contact the outer surface of a pipe element that is placed into the first aperture 106 of the housing 100 of the joint, causing the gripper members 161 and the gripping assembly 160 as a whole to grab onto the pipe element. Also, the interior cylindrical surface 156 of the seal 152 is pressed onto the outer surface of the pipe element, preventing any fluid from entering the space found between the pipe element and the seal as such space is effectively eliminated. Thus, an improved seal for use on irregular pipe surfaces due to the positive movement of the seal into contact with the pipe element may be provided. The camming motion in this embodiment is effectuated by the draw-bars 184a, 184b, 184c that have threaded ends 186a, 186b, 186c that extend past the exterior annular surface 138 of the flange 134 and have nuts 188a, 188b, 188c attached thereto via their internal threads. A wrench may be used to tighten the nuts 188 that press on the load bearing surface, causing the draw-bars 184a, 184b, 184c and platform 182 to translate, creating the camming motions all as have been previously described herein.

It should be noted that the movement and construction of the draw-bar assembly 180, seal 152 and gripper assembly 160 as just described for this embodiment may be altered for other embodiments of the present disclosure. For example, the orientation of the first aperture may be reversed so that the draw-bars extend toward the interior of the housing of the joint and not the exterior of the housing. In such a case, the flange may be located toward the interior of the housing and another aperture that is smaller than the larger diameter of the first aperture may be found at the first end of the housing. Similarly, the seal may not have an angled surface that contacts or engages the inside surface of the first aperture but may have a standard O-ring type configuration. Also, the seal may be a single piece of material or may comprise a plurality of seals. Furthermore, the draw-bar assembly may use something other than nuts and threaded draw-bars for the draw members and actuators such as a sliding clamp assembly that holds position using friction. In some applications, the draw member may push onto the seal or gripping member instead of pulling on them. Accordingly, the terms "draw" or "drawing" as used herein should be interpreted broadly to cover any motion that forces movement in either direction found along the longitudinal axis or in any direction or type of motion that includes curved motions that causes a component to move or contact a cam surface.

Figure 7B:
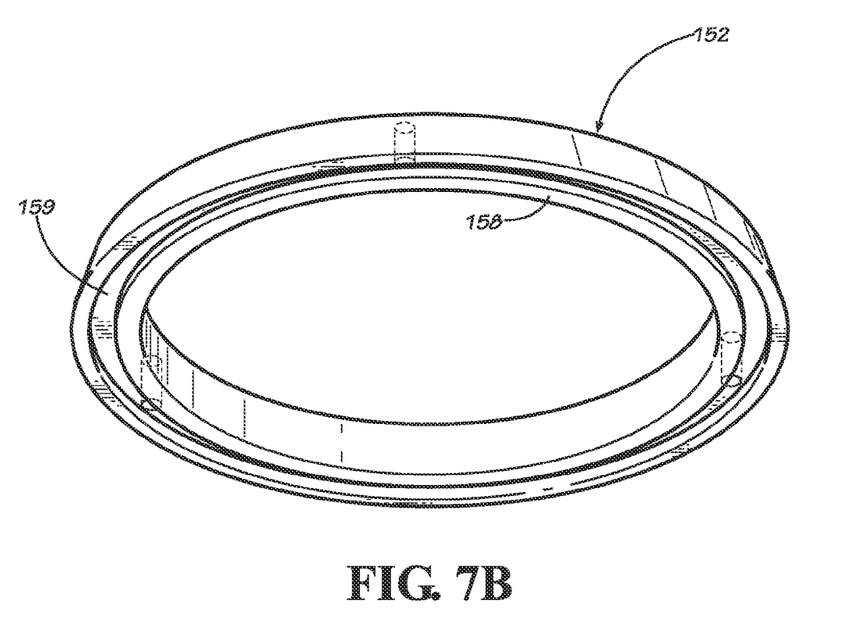

As shown by FIG. 5, the seal 152, gripper assembly 160 and draw-bar assembly 180 made be assembled as follows into the housing 100. The platform 182 of the draw bar assembly 180 may be made of spring steel and the draw-bars 184 may be attached thereto via welding or even integral with the ring that forms the platform 182. The flexibility of the ring could be used to compress it until it can fit within the first aperture 106 of the housing 100 and be inserted. The angular orientation of the draw-bars 184 and platform 182 about the longitudinal axis A of the housing 100 can be such that they initially fit within the slots or holes 101 of the housing 100 that allow them to reach the exterior of the housing 100 or this orientation may be achieved after the platform 182 has been inserted into the first aperture 106. Then the resilient nature of the seal 152 and the gripper assembly 160 may be used to compress them and allow them to be inserted into the first aperture 106. As can be seen in FIGS. 4 and 7B, there is a groove 159 on the bottom surface 158 of the seal 152 for receiving the ring of the platform 182, allowing the seal 152 to sit flush with the first stop surface 112 of the first aperture 106 of the housing 100.

In other embodiments, the ring or platform 182 may be split into separate segments that are each individually attached to a draw member 184. In such embodiments, the seal 152 could be molded onto each of the draw members 184 and platform segments so that the draw assembly and seal are integrated. The resilient nature of the seal and the distance provided between each of the platform segments would allow the seal, platform and draw bars to be compressed and inserted into the first aperture of the housing. Alternatively, the housing 100 could be split where the first aperture 106 meets with the third aperture 110, allowing the internal components and assemblies to be placed in the housing 100 easily before the split housing is assembled in a suitable fashion that is also fluid tight using methods and devices known in the art as discussed elsewhere within the present disclosure.

Other modifications include the fact that the surface or surfaces of the gripper assembly that contact the inside surface of the first aperture may be may be something other than angled such as curved so that only a line of contact is made between the gripper assembly and the inside surface of the first aperture. Likewise, the gripper assembly may be replaced by an essentially single piece of material that has a slit in it to allow the reduction of size of the gripper member. For example, the gripper member shown and described by U.S. Pat. No. 7,004,511 to the common assignee of the present application, the content of which is incorporated herein for all purposes in its entirety, may be used. Such a gripping member may extend the majority of a full circle or 360 degree rotation about the longitudinal axis of the joint and have ridges for gripping onto a pipe element.

The operative association between the draw-bar assembly and the seal and the housing is achieved in this embodiment by having the seal sit on a platform that is directly tied to the draw member but it is contemplated that in other embodiments that this operative association could be achieved in other ways including using a component that is placed between the platform or seal and the draw member. Also, the joint may use something other than threads and a nut for moving the seal. In some embodiments, it may only be the seal that is moved by the draw member so that it is drawn into engagement with the inside surface of the housing of the first aperture. Similarly, the operative association between a draw member and the gripper assembly or a single gripping member may be achieved as shown in this embodiment by placing the gripping member on the seal that is contacted by the platform and attached to the draw member. However, it is contemplated that a separate draw member may be used in conjunction with the gripping member and that in some embodiments, only one of the gripping member or the seal may be operatively associated with the draw member for moving either component into engagement with the insides surface of the first aperture to draw either the seal or the gripping member into contact with the pipe. Also, the gripping member could be located between the seal and the platform instead of the other way around.

In embodiments where only the seal is moved by the draw member, the gripping member may ride directly on the cam or inside surface of the first aperture so that once a pipe element is inserted the housing, clamping of the grip member is accomplished by pulling on the housing a slight amount in the opposite direction so that the gripping member begins to contact the pipe and slide up the cam surface, tightening the gripping members' hold onto the pipe element. Any of the methods disclosed herein may have these steps added to them or substituted for the step of drawing the gripping member into engagement with the cam or internal surface of the first aperture and into contact with a pipe element for holding the housing onto a pipe element. It should be noted in any of the embodiments herein that once the gripping member and seal have been suitably closed upon the pipe element, that hydraulic forces provided by any fluid that seeps between the pipe element and the housing may only provide further force that causes the seal and gripping member to contact the pipe element even tighter, aiding their respective functions of preventing fluid leaks and disassembly of the joint.

In some embodiments, the draw member extends past an exterior surface of the housing but it is contemplated that in other embodiments, the draw member can be housed entirely within the housing as could be the case if the method of moving the draw member was located within the housing. For example, the nut or other rotating member such as thumb wheel could extend partially through a slot found on the housing for moving a threaded shaft for moving the seal or gripping member. Furthermore, a plurality of draw members may be used regardless of whether the draw member extends past an exterior surface of the joint and in other cases only a single draw member may be used. In certain embodiments where the draw member extends past the exterior surface, the exterior surface may be perpendicular to the longitudinal axis of the joint as is the case described above regarding the bearing surface found adjacent the first aperture.

"Pipe elements" may mean pipes, valves, meters, hydrants or any other structure where the connection is suitable to be sealed. The housing of a joint may be made from iron, other metal such as stainless steel, plastic or any suitable material that provides the strength necessary for providing a fluid proof joint. The housing or housings may be molded, cast, machined or made by any other suitable manufacturing process.

Figure 8:
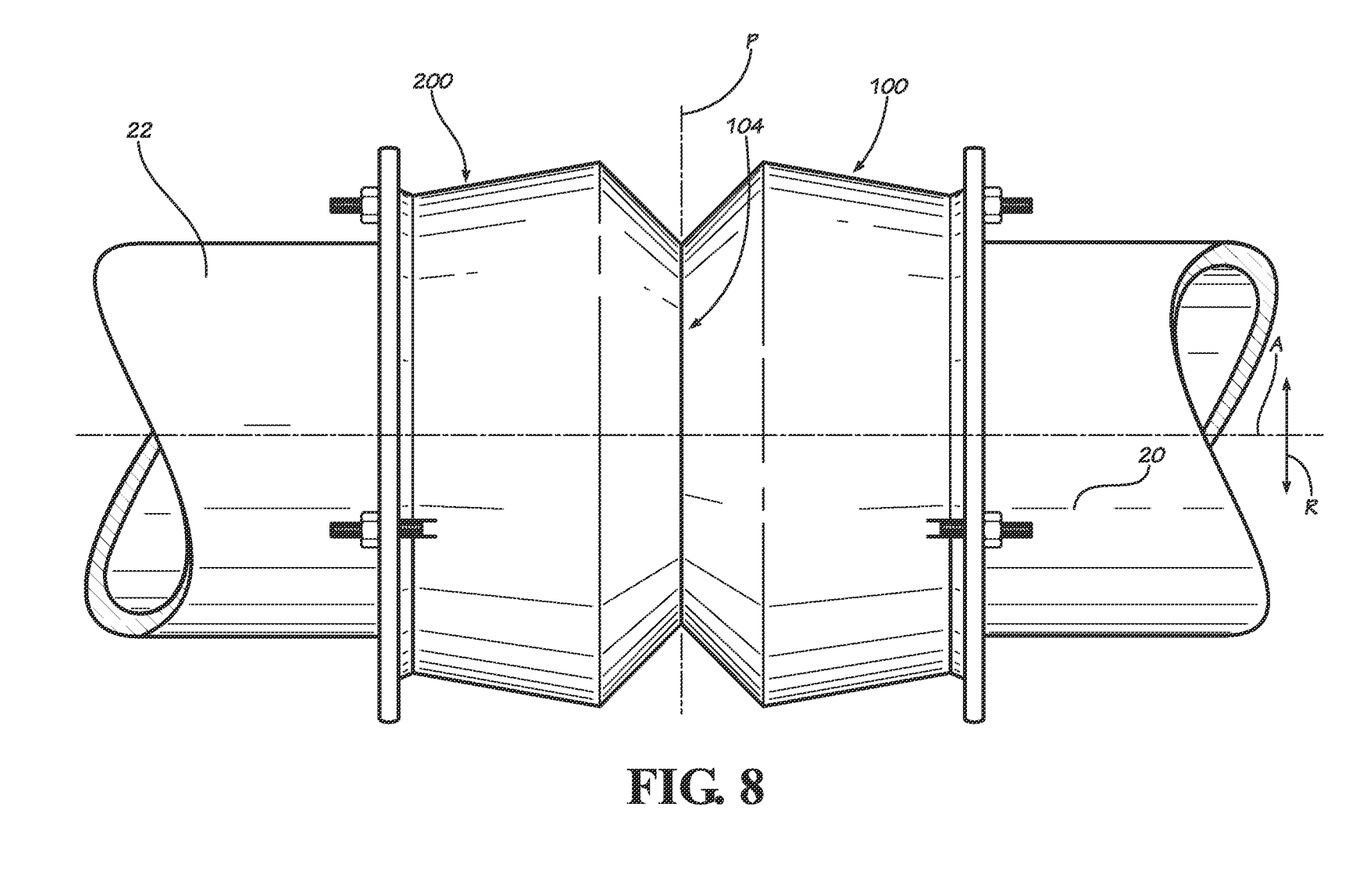
FIG. 8 is a front view of a coupling providing two joints for joining two pipes or pipe elements according to a second embodiment of the present disclosure.

In further embodiments such as disclosed in FIG. 8, two housings 100, 200 may be used to form a pipe coupling for joining two pipe elements 20, 22 such as pipes wherein the second housing 200 has the same configuration as the first housing 110 and is symmetrically arranged with respect to the first housing 100 about a plane P that is found along the second end 104 of the first housing 100 at the second aperture (not shown). The plane P is perpendicular to the longitudinal axis A of the coupling. In some embodiments, the coupling would have a straight longitudinal axis and in other embodiments could be curved, right angled and even U-shaped where the flow of water would be reversed in direction, etc. The configuration of the housings, seals, gripping member, draw member and their modes of operation could be the same as just described above with respect to the embodiments contained in FIGS. 1 thru 7B or the configurations and modes of operation of each component or assembly could be different from one side of the plane P to the other. In particular, the coupling may include a second seal (not shown), a second gripping member (not shown) and a second draw member (not shown) that are operatively associated with the second housing 200 for drawing the second seal or second gripping member into engagement with the inside surface (not shown) of the first aperture (not shown) of the second housing 200 and into contact with a second pipe element 22 that is placed into the coupling.

In some embodiments, the housings would be identical and be made using the same material and method of manufacturing. They would then be joined to each other using methods known in the art for providing a fluid tight seam such as welding or using epoxies, etc. In other embodiments, the housings would be made from a unitary piece of material such as would be the case if they were made simultaneously during a casting or molding process. Alternatively, the housings could be machined from a single piece of material.

Figure 9A:
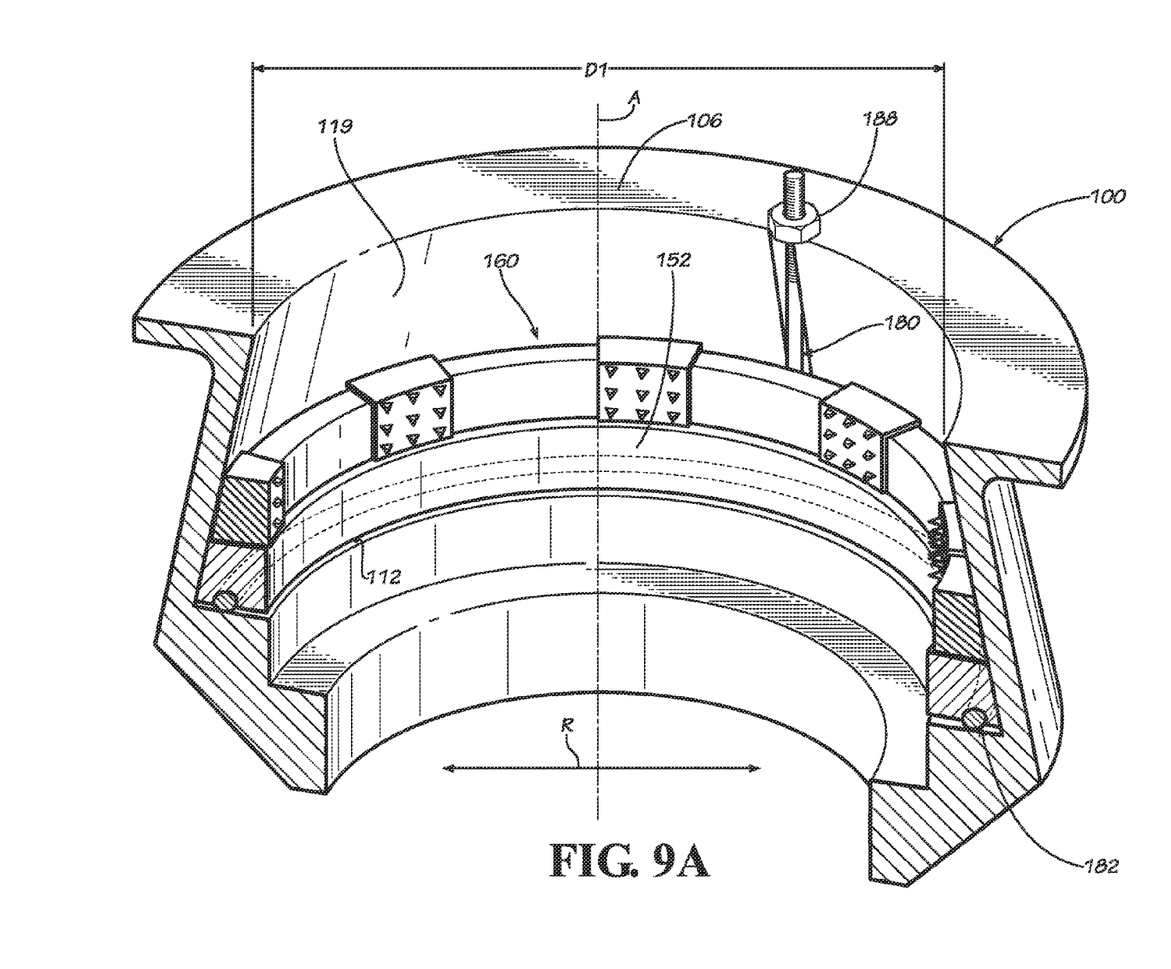
FIG. 9A is a cross-sectional view of the joint of FIG. 1 before installation on pipe elements.
Figure 9B:
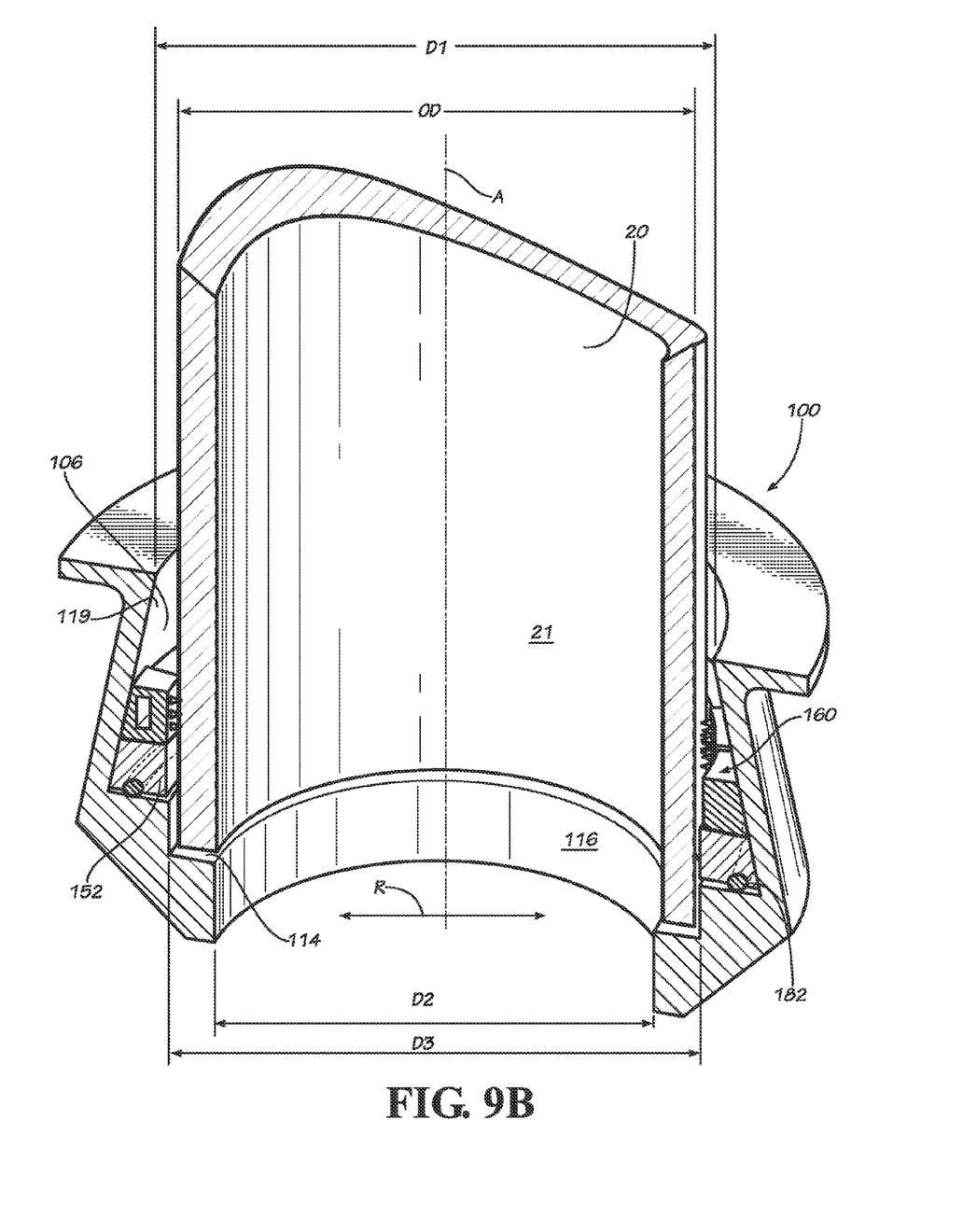
FIG. 9B is a cross-sectional view of the joint of FIG. 1 during installation on pipe elements.
Figure 9C:
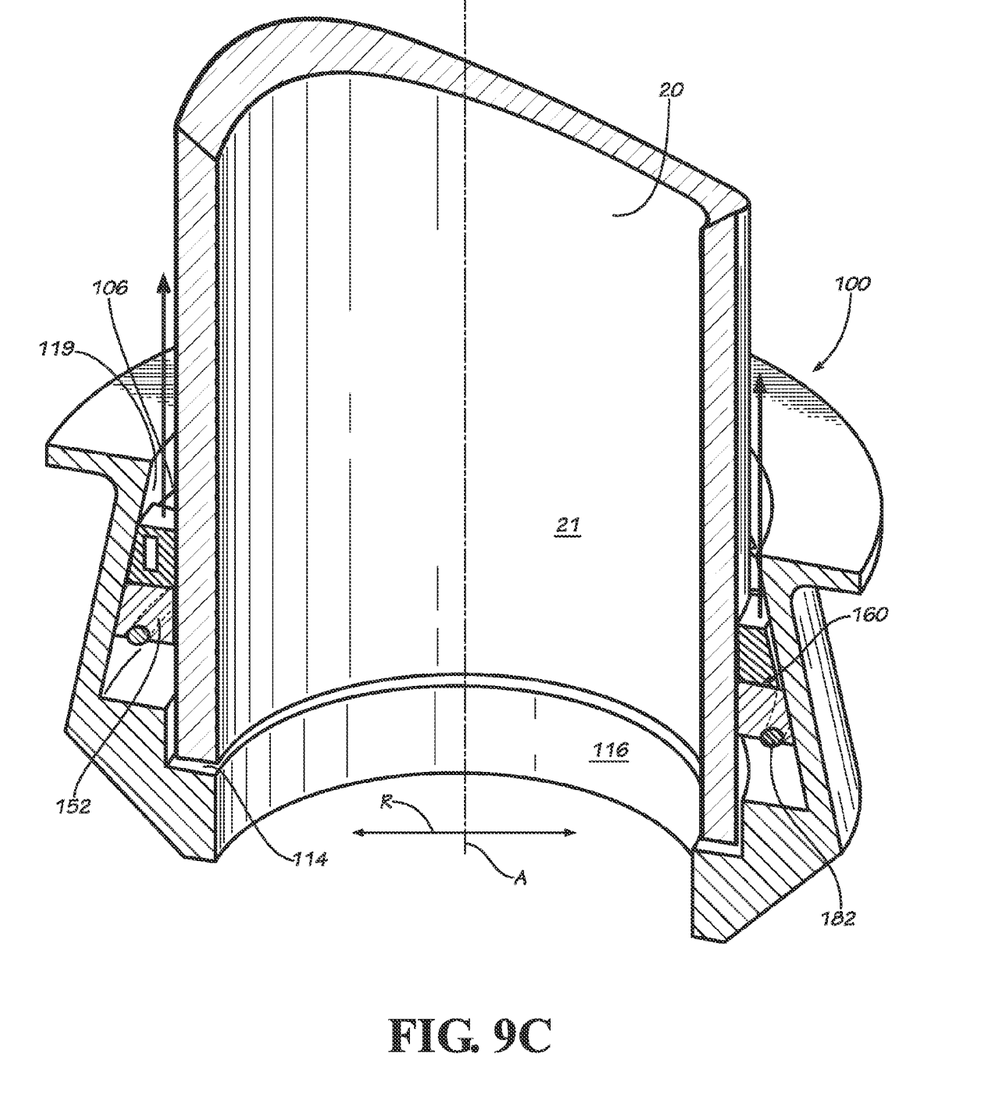
FIG. 9C is a cross-sectional view of the joint of FIG. 1 after installation on pipe elements.

Looking at FIGS. 9A, 9B and 9C, an example of how a single housing 100 may be used with a single pipe element 20 is shown. Initially as shown by FIG. 9A, the resilient nature of the gripper assembly 160 and seal 152 forces both the gripper assembly 160 and the seal 152 into an untightened or relaxed positioned via the camming action with the inside conical surface 119 of the first aperture 106 that forces both of them toward the interior of the housing 100 so that they are touching or almost touching the first stop surface 112 associated with the shoulder found at the bottom of the first aperture 106. Since the draw-bar assembly 180 is in contact with the seal 152 and gripper assembly 160, it is also pushed in a retracted position along the longitudinal axis A of the housing provided that the nuts 188 are in a loosened position such that the platform 182 can touch or nearly touch the first stop surface 112. Alternatively, the nuts 188 may be loosened and the draw-bar assembly may be placed manually in a retracted position allowing the seal and gripper assembly to assume a retracted position more easily using the biasing force of their resilient nature and camming actions provided by their contact with the inside conical surface of the first aperture. Then, a first pipe 20 is inserted into the first aperture 106, usually until it bottoms out on the second stop surface 114 found at the bottom of the first aperture 106. Since the diameter D1 of the opening of the first aperture 106 is greater than the outer diameter OD of the pipe element 20 as shown in FIG. 9B, the housing 100 of the joint can accommodate pipe elements of various diameters and/or that are inserted at an angle that may be a result of a pipe that is sagging or deflecting under its own weight of because of misalignment or eccentricity with another pipe element to which the housing is to be used for creating a fluid tight joint.

In other words, because the housing or coupling has the unique tightening ability to adjust for pipes of different diameters, that is to say, because it has multiple tightening positions, it has the ability to have its gripping members engage the pipe element at different times to enable a greater degree of deflection of the pipe element if needed.

In fact, in one embodiment a pipe element having a diameter that varies as much as half an inch for a standard diameter or size of a pipe element can be used with the joint. In certain embodiments, the pipe joint has a plurality of sizes so that different diameters of pipe elements can be accommodated ranging from 3 inches to 24 inches. However, it is contemplated that different sized pipe elements could be handled by other embodiments. Also, because of the biasing of the seal and gripper member into relaxed and open positions, clearance is provided between the pipe element and the housing allowing a no-interference fit prior to tightening the housing onto the pipe element, easing installation of the housing onto the pipe element or the pipe element into the coupling. However, it is contemplated that in certain embodiments, such clearance is not necessarily provided.

The thickness of the pipe element 20 is such that it is approximately equal to the thickness of the shoulder of the first stop surface 112 in the radial direction R of the housing 100, which is also approximately equal to the difference in the diameters D2 and D3 of the second and third apertures 108, 110. Consequently, as shown by FIG. 9B, the inside cylindrical surface 21 of the pipe element is essentially coextensive with the inside cylindrical surface 116 of the second aperture 108 of the housing 100. Another pipe element may be inserted into the second aperture 108 and sealed using methods known in the art such as welds or epoxies that are fluid tight. Otherwise, the inside cylindrical surface 116 of the second aperture 108 may be substituted with pipe threads so that a pipe element such as an externally threaded pipe or pipe nipple can be attached using the pipe threads to produce a water tight seal between the housing or coupling and the second pipe element. In such a case, a hexagonal structure may be provided on the exterior of the coupling for tightening of the coupling onto the pipe element using a wrench or similar tool. On the other hand as depicted by FIG. 9C, the housing 100 may be attached to the first pipe element 20 using a wrench to tighten the nuts (not shown), which causes the seal 152 and gripper assembly 160 to ride up on the conical surface 119 and contact the first pipe element 20, creating a water tight seal and preventing removal of the housing from the first pipe element in ways already described herein.

To be more explicit, the following method for joining or coupling first and second pipe elements may be used in conjunction with certain of the embodiments of the coupling disclosed herein that comprises the following steps. The method includes obtaining or providing a joint that includes a housing that defines a longitudinal axis and that includes a first end located along the longitudinal axis that defines a first aperture that is at least partially decreasing in size along the longitudinal axis. The aperture may be further defined by a surface that is found inside the housing. The second end of the housing that is located along the longitudinal axis may define a second aperture. The coupling may further include a seal and a gripping member as well as draw member that is operatively associated with the seal and the housing for drawing the seal into engagement with the inside surface of the first aperture of the housing and into contact with a pipe that is placed into the coupling. The method may further comprise placing the coupling onto the first pipe element and drawing the draw member and seal until the seal engages the inner surface of the first aperture of the housing and contacts the pipe element.

The method may further comprise obtaining or providing the joint such that it includes having a draw member that is in operative association with the gripping member. The method may further include drawing the gripping member into engagement with the inside surface of the first aperture of the housing and into contact with the first pipe. In certain embodiments, the same draw member may be operatively associated with both the gripping member and the seal and the drawing of the seal and the gripping member may be performed simultaneously.

In certain embodiments, the method may further include obtaining or providing a second housing that is similarly configured to the first housing, or that is identical to the first housing, such that the second housing also has a first aperture with an inside surface. The second housing may be attached to the first housing and the coupling may further comprise a second seal, a second gripping member and a second draw member. The method may further comprise the steps of slipping the second housing of the coupling onto the second pipe element and drawing the second draw member and second seal until the second seal engages the inner surface of the first aperture of the second housing and contacts the second pipe element.

In further embodiments, obtaining or providing the coupling may include having a draw member in operative association with both the gripping member and/or the seal. The method may further include drawing the second gripping member into engagement with the inside surface of the first aperture of the second housing and into contact with the second pipe element. In certain embodiments, the same draw member may be operatively associated with both the second gripping member and the second seal and the steps for drawing the second seal and the second gripping member are performed simultaneously.

It should be noted that any of the steps of any of the methods described herein may be performed in any order or could be performed in sub-steps that are done in any order or that are separated in time from each other by other steps or sub-steps. Similarly, the steps of slipping any coupling onto any pipe element is to be construed broadly and includes both situations where the coupling is moved onto the pipe element or where the pipe element is moved into the coupling as both effectuate the same end result, that is to say, the coupling is placed onto the pipe element after moving one of the components. The same principle should be applied to any step of any method disclosed herein where there is relative movements between structural components.

This assembly configuration represents one of many possible assembly configurations. One skilled in the art will understand obvious variations of this assembly configuration are included within this disclosure, including variations of steps, combinations of steps, and dissections of steps, among others. Where materials are chosen for the elements of this assembly—particularly, rubber, metal, and cast iron—similar material choices may also be used and would be obvious to one in the art. As previously disclosed, the seal or gasket may be made of rubber, plastic, cork, wood, metal, ceramic, polymer, elastomer, rosin, foam, any combination of the foregoing materials, or any material suitable for sealing two pipe elements joined in any configuration including an end-to-end relationship. The housing or housings may be made of cast iron, steel, aluminum, titanium, copper, brass, various plastics, polymers, resins, or any material of sufficient strength to withstand the tightening load of the fasteners. Furthermore, the draw-bar assembly and the gripping assembly are given by way of non-limiting example only and it is sufficient in certain embodiments of the present disclosure to provide one or more gripping members or one or more draw members that may or may not be part of a larger assembly.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

That which is claimed is:

1. A joint comprising:
    a housing wherein the housing defines a longitudinal axis and includes:
        a first end located along the longitudinal axis that defines a first aperture that is at least partially decreasing in size along the longitudinal axis, said first aperture further defined by a surface located inside the housing;
        a second end located along the longitudinal axis that defines a second aperture; and
        a third aperture located between the first and second apertures that is configured for receiving a pipe element, said third aperture being further defined by a shoulder that said pipe element can contact, preventing the pipe element from reaching the second aperture;
    a seal that is in contact with the inside surface of the first aperture of the housing;
    a gripping member; and
    a draw member that is operatively associated with the seal and the housing.

2. The joint of claim 1, wherein said draw member is also in operative association with the gripping member, said gripping member being in contact with the inside surface of the housing.

3. The joint of claim 2, further comprising a platform that is connected to the draw member and wherein the gripping member and seal are located adjacent the platform.

4. The joint of claim 3, wherein the seal is located between the gripping member and the platform along the longitudinal axis of the housing.

5. The joint of claim 1, wherein the draw member extends through the housing of the joint past an exterior surface of the housing.

6. The joint of claim 5, wherein the exterior surface of the housing is perpendicular to the longitudinal axis of the housing.

7. The joint of claim 1, further comprising a plurality of draw members each having an end that extends past an exterior surface of the housing.

8. The joint of claim 1, wherein the draw member includes a threaded end that extends past an exterior surface of the housing and which further comprises a nut that engages the threads of the draw member and the exterior surface of the housing for tightening the coupling.

9. The joint of claim 1, wherein the longitudinal axis of the housing is straight from the first end to the second end of the housing.

10. The joint of claim 9, further comprising a second housing that is has the same configuration as the first housing and that is symmetrically arranged with respect to the first housing about a plane that is found along the second end of the first housing at the second aperture, said plane being perpendicular to the longitudinal axis.

11. The joint of claim 1, wherein the seal has an annular shape that extends a full circle about the longitudinal axis of the housing.

12. The joint of claim 1, wherein the gripping member extends the majority of a full circle about the longitudinal axis of the housing and has ridges for gripping a pipe element.

13. The joint of claim 1, which further comprises a plurality of gripping members that are interconnected by bodies formed of a resilient material forming a complete circle about the longitudinal axis of the housing, each of said gripping members having protuberances for gripping a pipe element.

14. The joint of claim 1, wherein the first aperture decreases in size along the longitudinal axis in a direction going toward the exterior of the housing.

15. The joint of claim 1, wherein the third aperture has a diameter, the second aperture has a diameter, and the pipe element has an inside diameter and an outside diameter, wherein the diameter of the third aperture is slightly greater than the outer diameter of the pipe element and the diameter of the second aperture is about the same as the inside diameter of the pipe element.

16. The joint of claim 1, wherein the housing is annular in configuration about the longitudinal axis and the inside surface of the first aperture is linearly tapered.

17. A method of joining first and second pipe elements wherein the joint includes a housing wherein the housing defines a longitudinal axis and includes a first end located along the longitudinal axis that defines a first aperture that is linearly tapered to decrease in size for the entire length of the first aperture along the longitudinal axis, said first aperture further defined by a surface located inside the housing and a second end located along the axis that defines a second aperture, located within the housing is a seal and a gripping member that are operatively associated with a draw member, said method comprising:
    placing the housing onto the first pipe element; and
    drawing the draw member and moving the seal until the seal engages the inner surface of the first aperture of the housing and contacts the first pipe element.

18. The method of claim 17, wherein the draw member is in operative association with the gripping member, said method further comprising drawing or moving the gripping member into engagement with the inside surface of the first aperture of the housing and into contact with the first pipe element.

19. The method of claim 18, wherein the same draw member is operatively associated with both the gripping member and the seal, and said steps for moving the seal and the gripping member are performed simultaneously.

* * * * *